United States Patent
Ito (10) Patent No.: US 6,512,880 B2
(45) Date of Patent: Jan. 28, 2003

(54) REMOTE CONTROL SYSTEM, VIDEO OUTPUT APPARATUS, RECORDING MEDIUM REPRODUCTION APPARATUS AND REMOTE CONTROL METHOD

(75) Inventor: Toshiaki Ito, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/814,162

(22) Filed: Mar. 22, 2001

(65) Prior Publication Data
US 2001/0041045 A1 Nov. 15, 2001

(30) Foreign Application Priority Data
Mar. 22, 2000 (JP) ........................................ 2000-080100

(51) Int. Cl.[7] ................................................ H04N 5/91
(52) U.S. Cl. ..................... 386/46; 348/734; 340/825.25
(58) Field of Search ..................... 340/825.25; 348/705, 348/734; 386/46; 439/502; H04N 5/91

(56) References Cited

U.S. PATENT DOCUMENTS

| | | | | |
|---|---|---|---|---|
| 4,581,645 A | * | 4/1986 | Beyers, Jr. ................... | 348/705 |
| 5,081,534 A | * | 1/1992 | Geiger et al. ................ | 348/734 |
| 5,220,269 A | * | 6/1993 | Chen et al. .................. | 320/112 |
| 5,488,357 A | * | 1/1996 | Sato et al. .................. | 340/825.25 |
| 6,075,566 A | * | 6/2000 | Suemoto et al. ............. | 348/372 |
| 6,151,067 A | * | 11/2000 | Suemoto et al. ........ | 348/207.99 |

FOREIGN PATENT DOCUMENTS

| | | | | |
|---|---|---|---|---|
| JP | 60-246061 | * | 12/1985 | ........... G11B/19/08 |
| JP | 1-129595 | | 5/1989 | |
| JP | 4-060335 | | 2/1992 | |
| JP | 5-82691 | | 11/1993 | |
| JP | 6-090484 | | 3/1994 | |
| JP | 7-322365 | | 12/1995 | |

* cited by examiner

Primary Examiner—Vincent Boccio
Assistant Examiner—James A Fletcher
(74) Attorney, Agent, or Firm—Crowell & Moring LLP (57) ABSTRACT

In conventional remote control systems, when a compact disk player is installed in a motor vehicle, an external wireless remote-control photoreception device, which is basically unnecessary for compact disk playback, must be provided in the limited internal space of the vehicle, thus the internal space is not effectively used. Further, in a case where the construction of conventional remote control system is applied to a video reproduction apparatus, a DVD reproduction apparatus and the like, as a video output apparatus to output a reproduced video image must be provided in the vehicle, the efficiency of use of the internal space must be further improved. When a remote control operation for video reproduction is performed by using a photoreception device 27 of a television set 20, an infrared signal outputted from a remote control transmission device 40 is received by the photoreception device 27, then a remote control signal based on the infrared signal is inputted into a microcomputer 11 provided in a video reproduction apparatus 10 via a remote-control signal output cable 50. Accordingly, a video reproduction operation based on the remote control signal can be performed even in the video reproduction apparatus 10 provided in a position away from a user.

10 Claims, 7 Drawing Sheets

REMOTE CONTROL SYSTEM, VIDEO OUTPUT APPARATUS, RECORDING MEDIUM REPRODUCTION APPARATUS AND REMOTE CONTROL METHOD

BACKGROUND OF THE INVENTION

1. Field of the Invention

The present invention relates to a remote control system, a video output apparatus, a recording medium reproduction apparatus and a remote control method, and more particularly, to a remote control system, a video output apparatus, a recording medium reproduction apparatus and a remote control method for playing a recording medium based on a remote control signal transmitted from a remote control device and performing video output based on a video signal obtained by the playback.

2. Description of the Prior Art

A remote control system disclosed in JP-A-246061/1985 is known as a conventional system.

This remote control system has an external wireless remote-control photoreceptor, connected to a compact disk player, which receives an infrared signal transmitted from a wireless remote control device to control the compact disk player. In a case where a wireless remote control photoreceptor, provided in the compact disk player, does not receive the infrared signal from the wireless remote control device, the external wireless remote-control photoreceptor receives the infrared signal so as to perform various operations. JP-U-82691/1993 also discloses a remote control system of this type.

In the above-described conventional remote control system, in a case where the compact disk player is installed in a motor vehicle, the external wireless remote-control photoreceptor, that is basically unnecessary for compact disk playback, must be arranged in the limited internal space, thus the space is not efficiently used.

Further, in a case where the construction of the above-described conventional remote control system is applied to a video reproduction apparatus, a DVD reproduction apparatus and the like, as a video output apparatus to output a reproduced video image must be provided in the internal space of the vehicle, the efficiency of use of the internal space must be further improved.

SUMMARY OF THE INVENTION

The present invention has been made in consideration of the above problems, and has its object to provide a remote control system, a video output apparatus, a recording medium reproduction apparatus and a remote control method for realizing remote control by efficiently utilizing internal space even in a case where the recording medium reproduction apparatus is provided in a position away from a user.

According to the present invention, the foregoing object is attained by providing a remote control system comprising: a video output apparatus having: video output means for performing video output based on a predetermined video signal; remote-control signal reception means for receiving a remote control signal transmitted from a remote control device; and remote-control signal output means for outputting the remote control signal received by the remote-control signal reception means; and a recording medium reproduction apparatus having: video signal supply means for playing a recording medium and supplying a video signal obtained by playback to the video output means; remote-control signal input means for inputting the remote control signal outputted from the remote-control signal output means; and video-signal supply control means for causing the video signal supply means to perform supply of the video signal based on the remote control signal.

In the present invention having the above construction, when the remote-control signal reception means provided in the video output apparatus receives the remote control signal transmitted from the remote control device and the remote-control signal output means outputs the received remote control signal to the remote-control signal input means provided in the recording medium production apparatus, the remote-control signal input means inputs the remote control signal outputted from the remote-control signal output means, then the video-signal supply control signal causes the video signal supply means to play the recording medium based on the input remote control signal and supply the video signal obtained by the playback to the video output means provided in the video output apparatus. Then the video output means performs video output based on the video signal supplied from the video signal supply means.

In this construction, even in a case where the recording medium reproduction apparatus is provided in a position away from a user, the remote control device can play the recording medium by the recording medium reproduction apparatus by transmitting the remote control signal to the remote-control signal reception means provided in the video output apparatus provided in a position where the apparatus can receive the remote control signal.

Accordingly, the present invention can be realized only by using existing constructions such as a videocassette recorder and a television set without preparing new construction.

As described above, the present invention provides a remote control system which performs remote control by efficiently utilizing the space of arrangement even in a case where a recording medium reproduction apparatus is provided in a position away from a user.

The recording medium here may be a magnetic recording medium such as a video tape or an opto-magnetic recording medium such as a DVD. The recording medium does not limit the video signal recording format. The recording medium reproduction apparatus may be installed in an apparatus having a construction for recording a video signal such as a videocassette recorder or may be an apparatus only having a reproduction function. Further, the video output apparatus may be installed in a television set having a broadcast signal reception function or may be an apparatus capable of video output based on only a video signal supplied from the recording medium reproduction apparatus such as video output monitor.

Note that the recording medium reproduction apparatus may have a construction to receive the remote control signal by itself. As a construction in this case, according to another aspect of the present invention, in the remote control system, the recording medium reproduction apparatus further comprises remote-control signal reception means for receiving the remote control signal, and the video-signal supply control means causes the video signal supply means to perform supply of the video signal based on the remote control signal received by the remote-control signal reception means, further, when the remote-control signal input means can receive the remote control signal, the video-signal supply control means inhibits reception of the remote control signal by the remote-control signal reception means, and causes the video signal supply means to perform supply of the video signal based on the remote control signal inputted in the remote-control signal input means.

In the present invention having the above construction, when the remote-control signal input means cannot input the remote control signal, the video-signal supply control means causes the video signal supply means provided in the recording medium reproduction apparatus to supply the video signal based on the remote control signal received by the remote-control signal reception means provided in the recording medium reproduction apparatus.

Then, when the remote-control signal input means can input the remote control signal, the video-signal supply control means inhibits reception of remote control. signal by the remote-control signal reception means, and causes the video signal supply means to supply the video signal based on the remote control signal inputted in the remote-control signal input means.

Accordingly, when the recording medium reproduction apparatus is provided in a position where the apparatus can receive the remote control signal, video signal supply can be performed based on the remote control signal received by the remote-control signal reception means owned by the apparatus itself while input of the remote control signal into the remote-control signal input means is inhibited. On the other hand, when the recording medium reproduction apparatus is not in a position where the apparatus can receive the remote control signal, the video signal supply can be performed based on the remote control signal inputted in the remote-control signal input means. In this construction, the present invention can be realized only by utilizing general existing constructions such as a videocassette recorder and a television set having a remote control function without introduction of device having a new construction.

As described above, according to the present invention, the recording medium reproduction apparatus provided in a position away from a user can be remote controlled by utilizing general existing constructions, without introduction of device having a new construction.

As a construction for outputting the remote control signal from the remote-control signal output means to the remote-control signal input means according to another aspect of the present invention, in the remote control system, the remote-control signal output means and the remote-control signal input means are connectable with each other via a communication cable, and the remote-control signal input means has a remote-control signal input terminal in which an RCA jack (phono jack) provided at the end of the communication cable can be plugged.

In the present invention having the above construction, the user plugs the RCA jack provided at the end of the communication cable connected to the remote-control signal output means of the video output apparatus into the remote-control signal input terminal provided in the remote-control signal input means of the recording medium reproduction apparatus. Then, the remote control signal outputted from the remote-control signal output means is inputted via the communication cable into the remote-control signal input means.

In this construction, as connection operation between the video output apparatus and the recording medium reproduction apparatus is simplified, the recording medium reproduction apparatus can be easily operated by utilizing the remote-control signal reception means provided in the video output apparatus.

As described above, according to the present invention, the recording medium reproduction apparatus can be easily operated by utilizing the remote-control signal reception means provided in the video output apparatus.

The remote-control signal input terminal provided for connection with the video output apparatus may be utilized for reception of remote control signal by another means. As a construction in this case according to another aspect of the present invention, in the remote control system, when an RCA jack (phono jack), provided in the communication cable connected so as to output the remote control signal from a remote control reception device, is plugged in the remote-control signal input terminal, the video-signal supply control means causes the video signal supply means to perform supply of the video signal based on the remote control signal inputted into the remote-control signal input terminal from the remote control reception device.

In the present invention having the above construction, when the RCA jack (phono jack), provided in the communication cable connected to the remote control reception device capable of receiving the remote control signal, is plugged in the remote-control signal input terminal, the remote control signal received in the remote control reception device is inputted into the remote-control signal input means of the recording medium reproduction apparatus. Then the video-signal supply control means causes the video signal supply means to supply the video signal based on the remote control signal inputted into the remote-control signal input terminal.

Accordingly, the reception of the remote control signal by utilizing the video output apparatus or the reception of the remote control signal by utilizing the remote control reception device can be selected in accordance with a user's preference, only by providing the remote-control signal input terminal in the recording medium reproduction apparatus.

As described above, according to the present invention, the reception of the remote control signal by utilizing the video output apparatus or the reception of the remote control signal by utilizing the remote control reception device can be selected.

In a case where the remote control reception device does not have a power supply, the power supply is necessary for execution of the above reception of the remote control signal. As a construction in this case according to another aspect of the present invention, in the remote control system, the recording medium reproduction apparatus has a power supply output terminal in which an RCA jack (phono jack), provided in a power supply cable connected to the remote control reception device for electric power supply to the remote control reception device, can be plugged, and wherein when the RCA jack (phono jack) is plugged in the power supply output terminal, the recording medium reproduction apparatus supplies electric power to the remote control reception device via the power supply cable.

In the present invention having the above construction, when the RCA jack (phono jack), provided in the power source cable connected to the power source input terminal of the remote control reception device, is plugged in the power source output terminal provided in the recording medium reproduction apparatus, the recording medium reproduction apparatus supplies electric power to the remote control reception device via the power source cable. Then the remote control reception device performs the reception of the remote control signal by utilizing the electric power supplied from the recording medium reproduction apparatus.

Accordingly, even in a case where the remote control reception device does not have a power supply, the power supply can be easily ensured only by cable connection.

As described above, according to the present invention, even in a case where the remote control reception device does not have a power supply, the power supply can be easily ensured only by the cable connection.

The present invention has been described as a system having a video output apparatus and a recording medium reproduction apparatus, however, the present invention is useful as a single video output apparatus or recording medium reproduction apparatus.

As a construction in a case where the present invention is a single video output apparatus, provided is a video output apparatus comprising: video output means for performing video output based on a video signal supplied from a recording medium reproduction apparatus; remote-control signal reception means for receiving a remote control signal transmitted from a remote control device; and remote-control signal output means for outputting the remote control signal received by the remote-control signal reception means to the recording medium reproduction apparatus.

In the present invention having the above construction, when the remote-control signal reception means provided in the video output apparatus receives the remote control signal transmitted from the remote control device, the remote-control signal output means outputs the received remote control signal to the recording medium reproduction apparatus.

Then the recording medium reproduction apparatus plays the recording medium based on the remote control signal. When the video signal obtained by playback of the recording medium is supplied to the video output apparatus, the video output means performs video output based on the supplied video signal.

As described above, according to the present invention, even in a case where the recording medium reproduction apparatus is provided in a position away from a user, a video output apparatus capable of remote control by efficiently utilizing the space of arrangement can be provided.

Further, as a construction in a case where the present invention is a single recording medium reproduction apparatus, provided is a recording medium reproduction apparatus comprising: video signal supply means for playing a recording medium and supplying a video signal obtained by playback to a video output apparatus; remote-control signal input means for inputting a remote control signal outputted from the video output apparatus; and video-signal supply control means for causing the video signal supply means to perform supply of the video signal based on the remote control signal inputted in the remote-control signal input means.

In the present invention having the above construction, when the remote-control signal input means provided in the recording medium reproduction apparatus inputs the remote control signal outputted from the video output apparatus, the video-signal supply control means causes the video signal supply means to play the recording medium based on the input remote control signal, and supply the video signal obtained by playback to the video output apparatus.

As described above, according to the present invention, even in a case where the recording medium reproduction apparatus is in a position away from a user, a recording medium reproduction apparatus capable of remote control by efficiently utilizing the space of arrangement can be provided.

The above remote control can be realized as a method as well as a system having a material substance. As an example, provided is a remote control method, wherein when a video output apparatus receives a remote control signal transmitted from a remote control device, and outputs the remote control signal to a recording medium reproduction apparatus, the recording medium reproduction apparatus inputs the remote control signal outputted from the video output apparatus, then plays a recording medium based on the input remote control signal, and supplies a video signal obtained by playback to the video output apparatus, and then the video output apparatus performs video output based on the video signal supplied from the recording medium reproduction apparatus.

That is, the construction of the above system can be realized by a method.

As described above, according to the present invention, even in a case where the recording medium reproduction apparatus is provided in a position away from a user, a remote control method for performing remote control by utilizing the space of arrangement can be provided.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
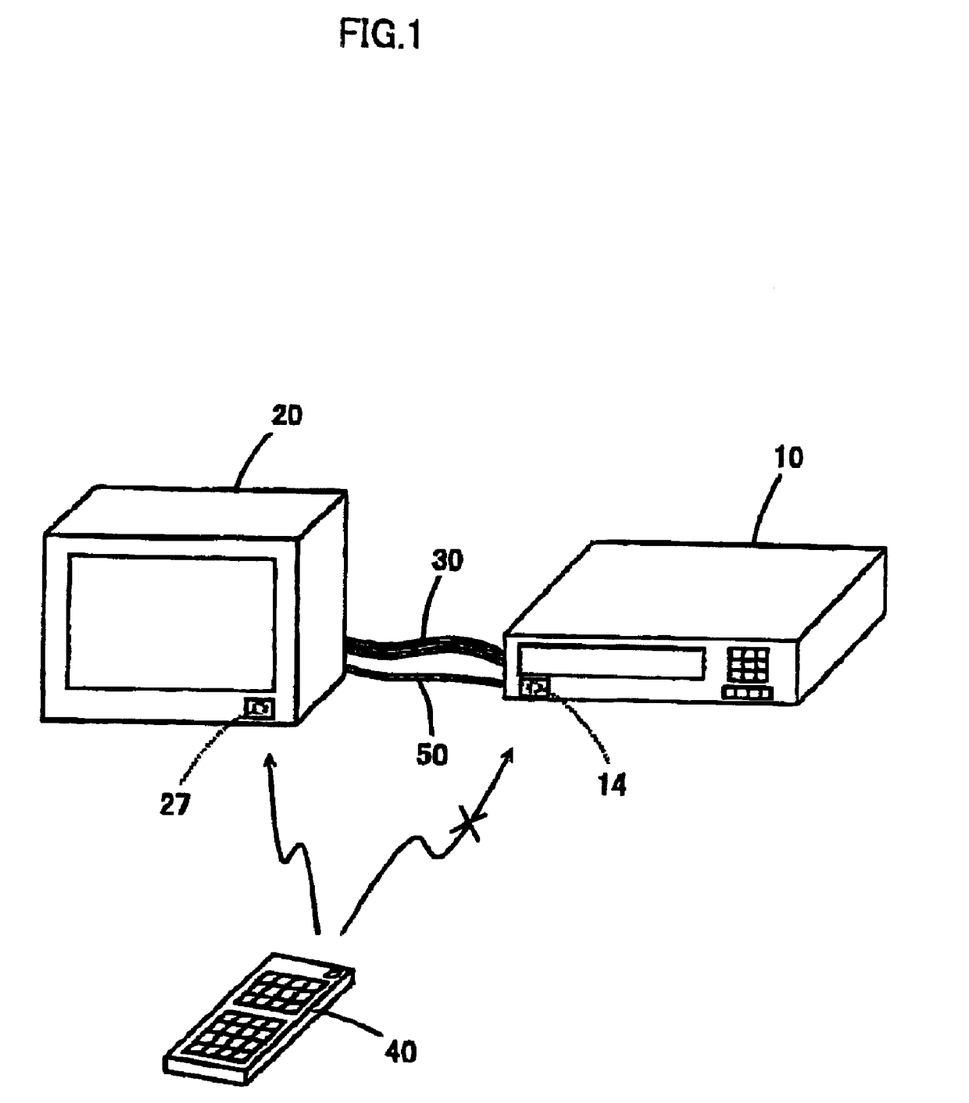
FIG. 1 is a perspective view showing a state where a video reproduction apparatus according to an embodiment is installed in a motor vehicle and connected to a television set.

FIG. 1 is a perspective view showing a state where a video reproduction apparatus according to an embodiment of the present invention is installed in a motor vehicle and connected to a television set.

Figure 2:
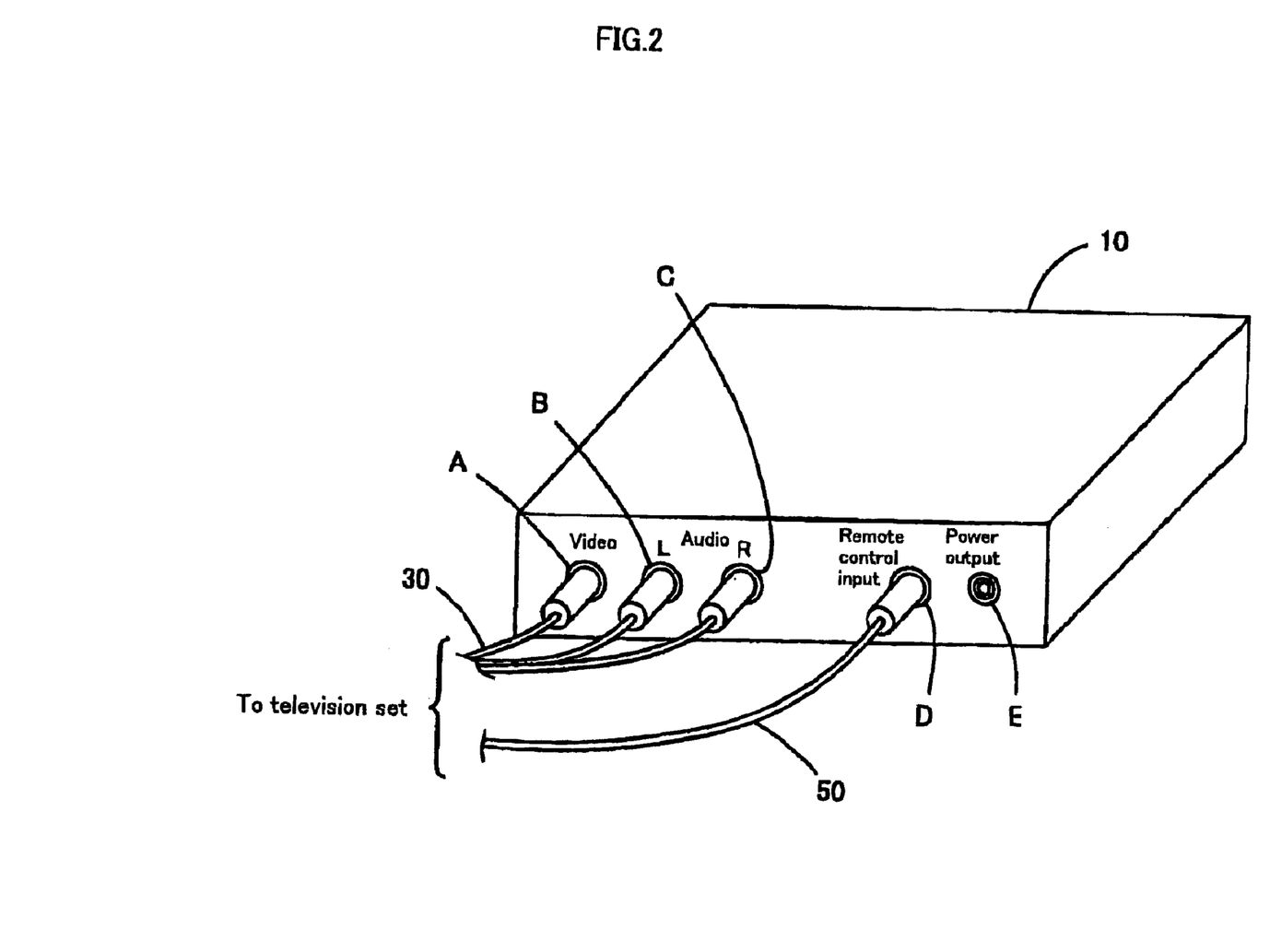
FIG. 2 is a perspective view showing the arrangement of connection terminals provided in a rear surface of the video reproduction apparatus.

As shown in FIG. 2, a video output terminal A and audio output terminals B and C, in which an RCA jack (phono jack) can be plugged, are provided in the rear surface of a video reproduction apparatus 10. Video/audio signal output cables 30, connected to a video input terminal and an audio input terminal provided in the rear surface of a television set 20, are connected to the terminals A to C. In this construction, when the video reproduction apparatus 10 plays a video tape, a video and audio signals obtained by the playback are supplied via the video/audio signal output cables 30 to the television set 20. The video reproduction apparatus 10 and the television set 20 correspond to the recording medium reproduction apparatus and the video output apparatus of the present invention.

Figure 3:
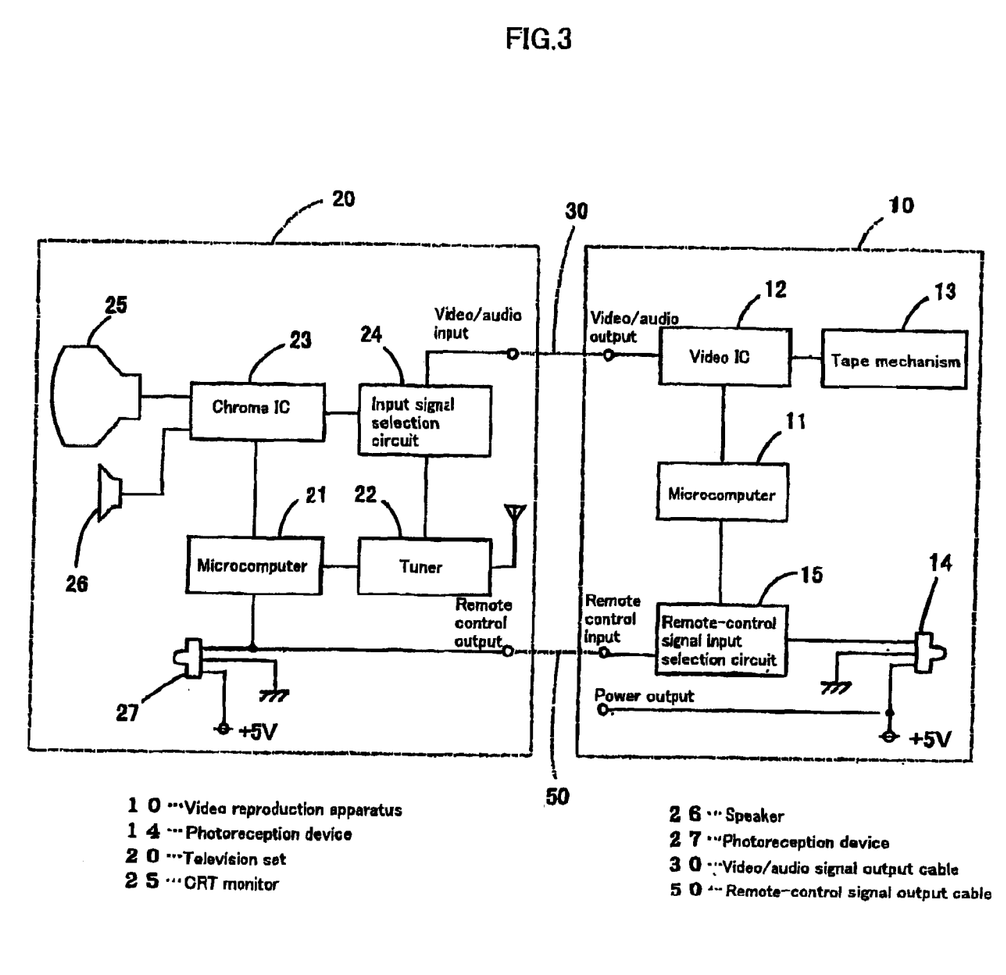
FIG. 3 is a block diagram showing the principle constructions of the video reproduction apparatus and the television set.

FIG. 3 is a block diagram showing the principle constructions of the video reproduction apparatus 10 and the television set 20.

The video reproduction apparatus 10 has a microcomputer 11 with a predetermined program execution environment. The microcomputer 11 is connected to a video IC 12.

The video IC 12 causes a tape mechanism 13 to play a video tape in correspondence with a control instruction from the microcomputer 11, and generates a video signal to be outputted from the video output terminal A and audio signals to be outputted from the audio output terminals B and C based on a video signal obtained by the playback. The microcomputer 11, the video IC 12 and the tape mechanism 13 to play the video tape and generate the video signal based on the video signal obtained from the playback correspond to the video signal supply means of the present invention.

On the other hand, the television set 20 has a microcomputer 21 with a predetermined program execution environment. The microcomputer 21 is connected to a tuner 22 and a chroma IC 23.

The tuner 22 receives a broadcast signal in correspondence with a reception frequency designated by the microcomputer 21 and outputs the received signal to the chroma IC 23. Note that an input signal selection circuit 24 which selects the external input signals from the video input terminal and the audio input terminals or the broadcast signal received by the tuner 22, in correspondence with a selection signal from the microcomputer 21, is provided between the tuner 22 and the chroma 23. Further, the chroma IC 23 performs predetermined signal processing on the signal outputted from the input signal selection circuit 24 in accordance with a control instruction from the microcomputer 21, and performs video and audio output at the CRT monitor 25 and the speaker 26.

Note that the microcomputer 21, the chroma IC 23 and the CRT monitor 25 to perform video output based on the external input signal correspond to the video output means of the present invention in this meaning.

As shown in FIG. 1, the video reproduction apparatus 10 and the television set 20 have photoreception devices 14 and 27 which receive an infrared signal from a remote control transmission device 40. Note that the remote control transmission device 40 and the photoreception devices 14 and 27 correspond to the remote control device and the remote-control signal reception means of the present invention.

However, in the present embodiment, if the system is installed in a motor vehicle, as the internal space of the vehicle is limited, the video reproduction apparatus 10 cannot be positioned within the reach of the infrared signal outputted from the remote control transmission device 40 in some cases.

Then the video reproduction apparatus 10 has a construction where the microcomputer 11 can perform various controls based on the infrared signal received outside the apparatus main body as well as the infrared signal received by the photoreception device 14.

That is, the video reproduction apparatus has a remote-control signal input selection circuit 15, which selects a remote control signal based on the external input infrared signal or a remote control signal based on the infrared signal received by the photoreception device 14, and outputs the selected remote control signal to the microcomputer 11, between the microcomputer 11 and the photoreception device 14.

Note that a remote control signal input terminal D, provided in the rear surface of the apparatus main body with the video output terminal A and the audio output terminals B and C, has a contact which is opened/closed in correspondence with plugged/unplugged status of an RCA jack (phono jack), attached to the end of a remote-control signal output cable 50 connected to a remote-control signal output terminal of the photoreception device 27 provided in the television set 20, in the remote-control signal input terminal D. The microcomputer 11 controls selection at the remote-control signal selection circuit 15 by detecting the plugged/unplugged status of the RCA jack (phono jack).

Note that the remote-control signal output terminal of the photoreception device 27 and the remote-control signal input terminal D correspond to the remote-control signal output means and the remote-control signal input means of the present invention, respectively, and the remote-control signal output cable 50 corresponds to the communication cable of the present invention.

Figure 4:
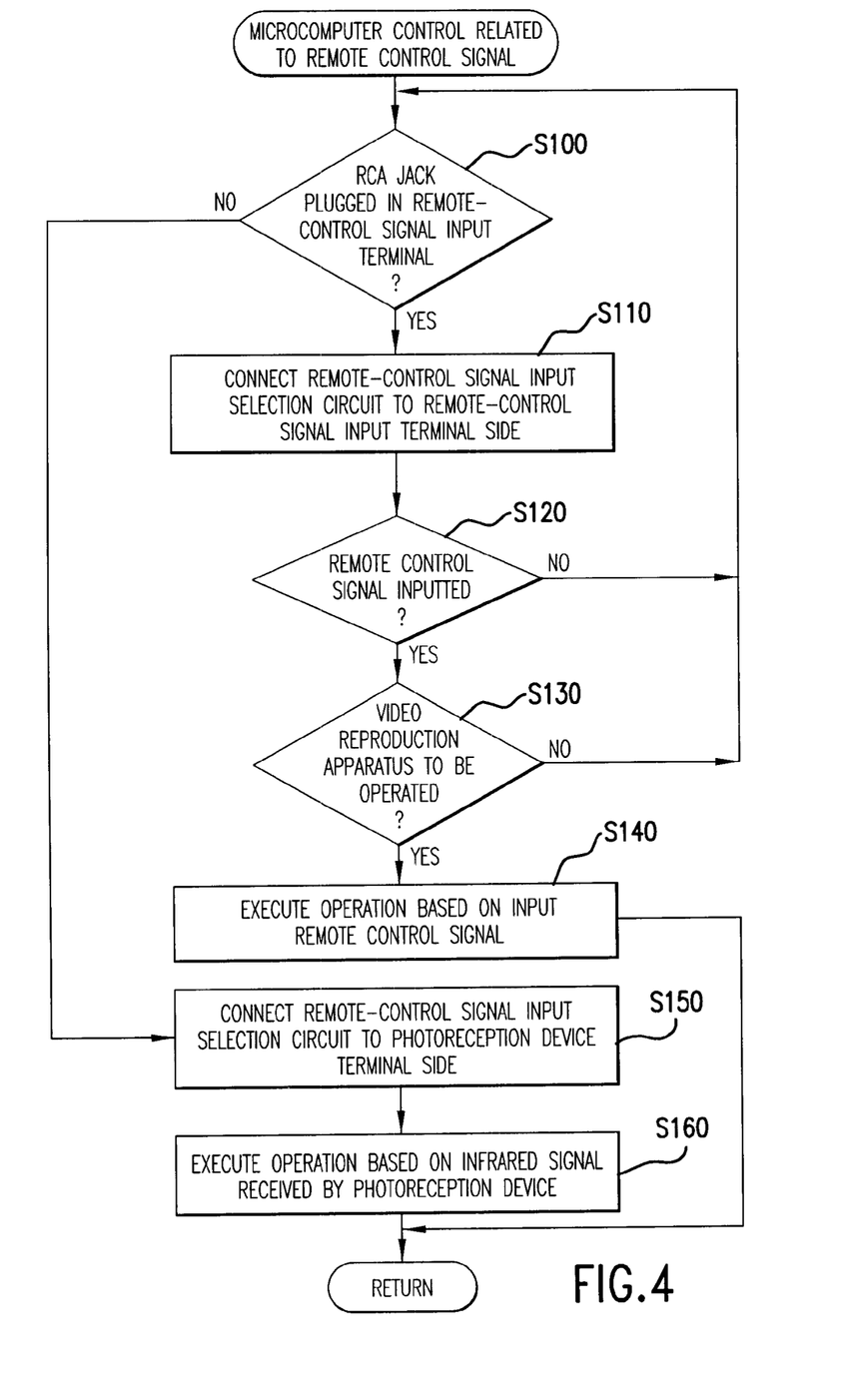
FIG. 4 is a flowchart showing a control procedure related to remote control signal in a microcomputer.

FIG. 4 is a flowchart showing a control procedure related to the remote control signal in the microcomputer 11.

When the RCA jack (phono jack) is not plugged in the remote-control signal input terminal D (step S100), the microcomputer 11 connects the remote-control signal input selection circuit 15 to the photoreception device 14 side (step S150), and performs various controls based on the infrared signal received by the photoreception device 14 (step S160).

On the other hand, when the RCA jack (phono jack) is plugged in the remote-control signal input terminal D (step S100), the microcomputer 11 connects the remote-control signal input selection circuit 15 to the remote-control signal input terminal D side (step S110), and performs various controls based on the infrared signal received by the photoreception device 27 (steps S120 to S140). In this meaning, the microcomputer 11 corresponds to the video signal supply control means.

For example, in the latter case, when the infrared signal is outputted from the remote control transmission device 40 toward the photoreception device 27, the photoreception device 27 receives the infrared signal, then outputs the remote control signal based on the infrared signal to the microcomputer 21 provided in the television set 20, and at the same time, outputs the remote control signal based on the infrared signal to the microcomputer 11 provided in the video reproduction apparatus 10, via the remote-control signal output terminal, the remote-control signal output cable 50, the remote-control signal input terminal D and the remote-control signal input selection circuit 15.

Accordingly, if the infrared signal outputted from the remote control transmission device 40 relates to the operation of the television set 20, the microcomputer 21 performs various controls in the television set 20 based on the corresponding remote control signal, while if the infrared signal outputted from the remote control transmission device 40 relates to the video reproduction device 10, the microcomputer 11 performs various controls in the video reproduction apparatus 10 based on the corresponding remote control signal.

Accordingly, the video reproduction apparatus 10 can be remote-controlled by utilizing the photoreception device 27 provided in the television set 20, only by providing the connection cable for transmission of the remote control signal between the video reproduction apparatus 10 and the television set 20.

Note that even when the RCA jack (phono jack) is plugged in, the operation based on the remote control signal is performed at step S140, then the remote-control signal input selection circuit is connected to the photoreception device terminal side at step S150, and the operation based on the infrared signal is performed at step S160, in consideration of a case where the user operates the remote-control transmission device 40 directed toward the photoreception device 14 of the video reproduction apparatus 10.

In the above description, the remote control of the video reproduction apparatus 10 is performed by utilizing the photoreception device 27 provided in the television set 20, however, the method is merely an example, but the remote control of the video reproduction apparatus 10 can be performed by utilizing another external construction.

Figure 5:
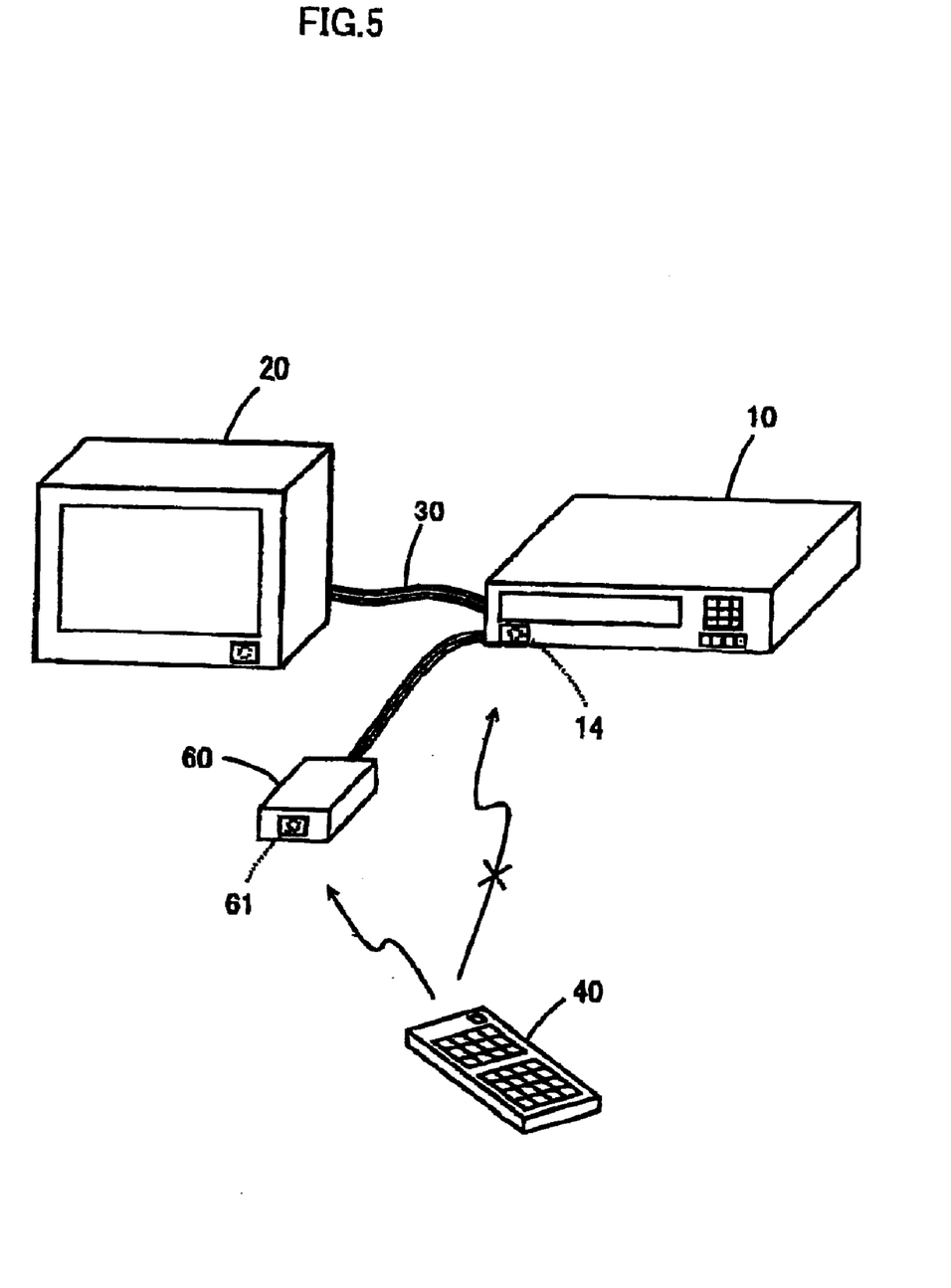
FIG. 5 is a perspective view showing a state where the video reproduction apparatus is connected to a remote control box.
Figure 6:
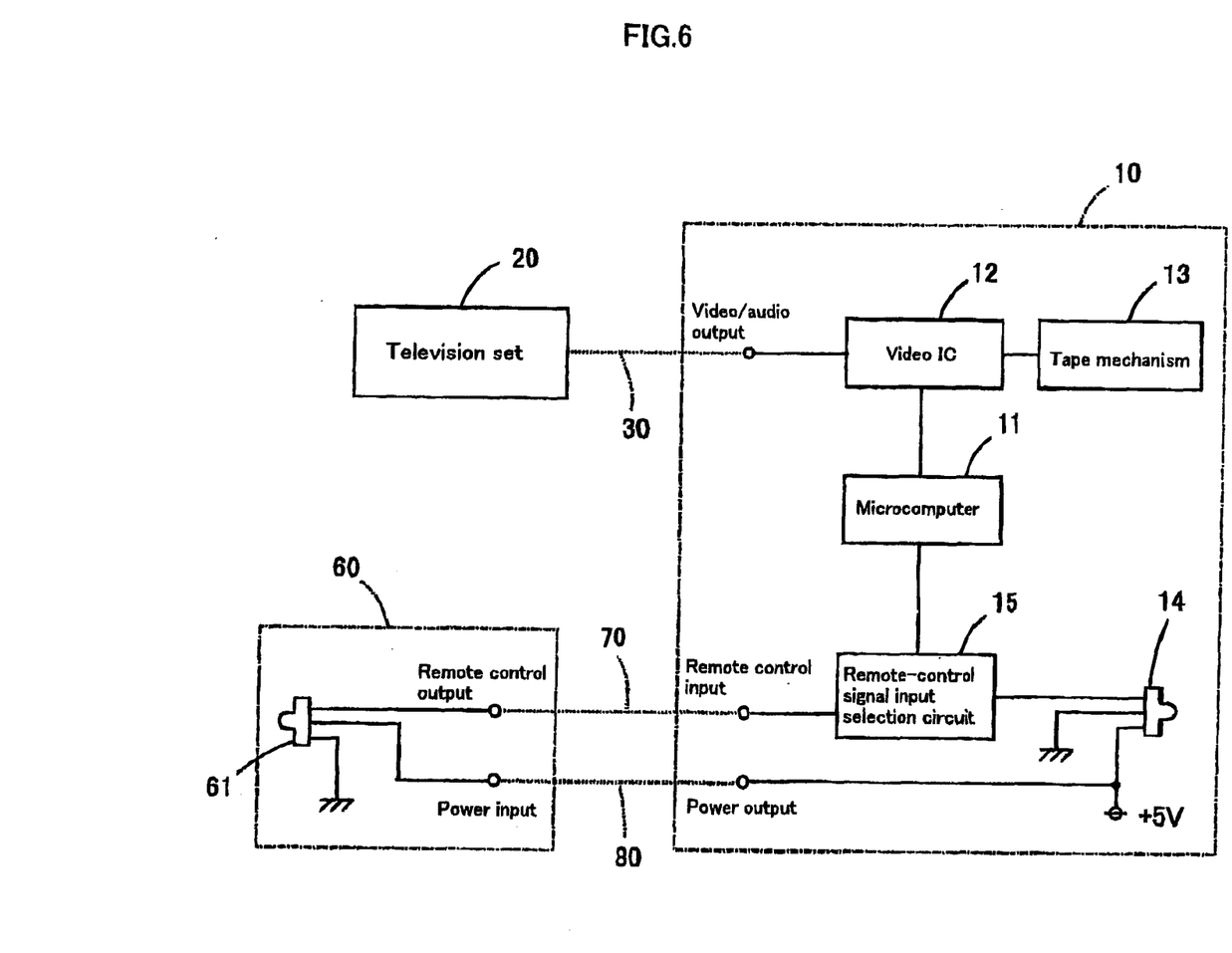
FIG. 6 is a block diagram showing the principle constructions of the video reproduction apparatus and the remote control box.

That is, as shown in FIGS. 5 and 6, a remote control box 60 as the remote control reception device of the present invention, having a photoreception device 61 which can receive the infrared signal outputted from the remote control transmission device 40, may be utilized. In this case, an RCA jack (phono jack), attached to the end of a remote-control signal output cable 70 connected to a remote-control signal output terminal of the photoreception device 61, is plugged in the remote-control signal input terminal D for connection with the video reproduction apparatus 10, and various controls are performed by the microcomputer 11 in accordance with the remote control signal based on the infrared signal received by the photoreception device 61.

In a case where the video reproduction apparatus 10 is remote-controlled by utilizing a photoreception device 27 provided in the television set 20, a power supply circuit provided in the television set 20 supplies electric power to the photoreception device 27, however, in a case where the video reproduction apparatus 10 is remote-controlled by utilizing the remote control box 60, a power supply route to the photoreception device 61 in the remote control box 60 must be ensured.

Figure 7:
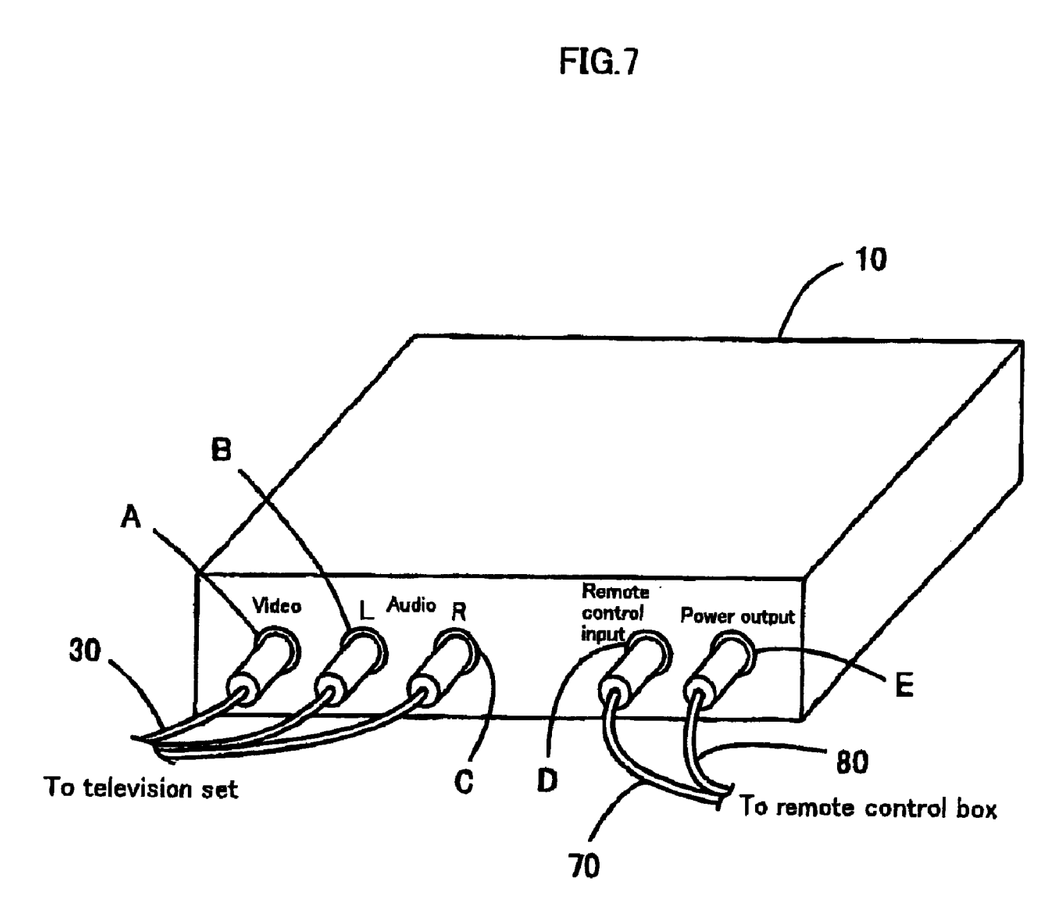
FIG. 7 is a perspective view showing the arrangement of connection terminals provided in the rear surface of the video reproduction apparatus according to a modification.

As shown in FIG. 7, a power-supply output terminal E, in which an RCA jack (phono jack) can be plugged, is provided in the rear surface of the video reproduction apparatus 10, with the video output terminal A, the audio output terminals B and C, and the remote-control signal input terminal D. Note that only power supply line and remote control signal line are necessary here, and if the ground can be shared between the apparatus and the vehicle body or the like, the power supply can be realized by using only one RCA.

In the above construction, when an RCA jack (phono jack), attached to a power supply cable 80 connected to the power supply input terminal of the photoreception device 61, is plugged in the power supply output terminal E for connection with the video reproduction apparatus 10, electric power supplied from a power supply circuit provided in the video reproduction apparatus 10 is inputted into the photoreception device 61 via the power supply output terminal E, the power supply cable 80 and the power supply input terminal. Accordingly, the photoreception device 61 can receive the infrared signal outputted from the remote control transmission device 40 by utilizing electric power supplied from the video reproduction apparatus 10.

Note that in the present embodiment, the signal processing control apparatus of the present invention is applied to the video reproduction apparatus 10, however, this construction is merely an example, but the present invention is applicable to a videocassette recorder capable of recording/reproduction. Further, the recording medium is not limited to a video tape. The present invention is applicable to reproduction apparatuses for DVDs, video CDs and the like.

Next, a procedure upon execution of video tape playback operation in the video reproduction apparatus 10 installed in a motor vehicle will be described.

The RCA jack (phono jack), attached to the remote-control signal output cable 50 connected to the remote-control signal output terminal of the television set 20, is plugged in the remote-control signal input terminal D of the video reproduction apparatus 10.

Then, the microcomputer 11 detects the plug-in of the RCA jack (phono jack) and sets the remote-control signal input selection circuit 15 to the remote-control signal input terminal D side.

Note that when the user performs video playback operation by using the remote control transmission device 40 toward the photoreception device 27, the infrared signal outputted from the remote control transmission device 40 is received by the photoreception device 27. The photoreception device 27 that received the infrared signal outputs the remote control signal based on the infrared signal to the microcomputer 11 provided in the video reproduction apparatus 10 via the remote-control signal output cable 50, the remote-control signal input terminal D and the remote-control signal input selection circuit 15.

At this time, the microcomputer 11 determines whether or not the input infrared signal relates to the video reproduction apparatus 10, and if it detects that the signal relates to an operation related to the video reproduction apparatus 10, i.e., the remote control signal for video reproduction operation, outputs a control instruction to the video IC 12 based on the remote control signal.

Then, the video IC 12 causes the tape mechanism 13 to play the video tape in correspondence with the control instruction, and generates the video signal based on the video signal obtained by the playback and outputs the signal from the video output terminal A.

The chroma IC 23 performs predetermined signal processing on the video signal, inputted via the video/audio signal output cable 30 and the input signal selection circuit 24, in accordance with a control instruction from the microcomputer 21, and performs video output on the CRT monitor 25.

In this manner, in a case where a remote control operation for video reproduction is performed by utilizing the photoreception device 27 of the television set 20, when the infrared signal outputted from the remote control transmission device 40 is received by the photoreception device 27, the remote control signal based on the infrared signal is inputted into the microcomputer 11 provided in the video reproduction apparatus 10 via the remote-control signal output cable 50. Thus, even if the video reproduction apparatus 10 is provided in a position away from the user, the video reproduction operation based on the remote control signal can be performed.

The present invention is not limited to the above embodiments and various changes and modifications can be made within the spirit and scope of the present invention. Therefore, to appraise the public of the scope of the present invention, the following claims are made.

What is claimed is:

1. A remote control system comprising:
   a video display apparatus having: a video display device for displaying a video image based on a video signal;

a remote control photoreception device for receiving an infrared signal transmitted from a remote controller and converting the received infrared signal into an electric remote operation signal; and a remote-control signal output terminal for outputting the remote control signal to outside; and a recording medium reproduction apparatus having: video signal supply means for playing a magnetic recording tape and supplying a reproduced video signal to said video display device; a remote-control signal input terminal for inputting the remote control signal outputted from said remote-control signal output terminal; video-signal supply control means for controlling the video signal supply means to supply the video-signal based on the input remote control signal; a remote control photoreception device; and a remote-control signal input selection circuit connected to the video-signal supply control means and to both the remote control photoreception device and remote-control signal input terminal of the recording medium reproduction apparatus, wherein when the remote-control signal input terminal is connected to the remote-control signal output terminal, the video-signal supply control means controls the remote-control signal input selection circuit to select the remote-control signal input terminal and to connect the remote-control signal input terminal to the video-signal supply control means, and wherein when the remote-control signal input terminal is not connected to the remote-control signal output terminal, the video-signal supply control means controls the remote-control signal input selection circuit to select the remote control photoreception device of the recording medium reproduction apparatus and to connect the remote control photoreception device of the recording medium reproduction apparatus to the video-signal supply control means.

2. A remote control system comprising:

a video output apparatus having: video output means for performing video output based on a predetermined video signal; remote-control signal reception means for receiving a remote control signal transmitted from a remote control device; and remote-control signal output means for outputting the remote control signal received by said remote-control signal reception means; and a recording medium reproduction apparatus having: video signal supply means for playing a recording medium and supplying a video signal obtained by playback to said video output means; remote-control signal input means for inputting the remote control signal outputted from said remote-control signal output means; video-signal supply control means for causing said video signal supply means to perform supply of the video signal based on the remote control signal; a remote control reception means; and a remote-control signal input selection means connected to the video-signal supply control means and to both the remote control reception means and remote-control signal input means of the recording medium reproduction apparatus, wherein when the remote-control signal input means is connected to remote-control signal output means, the video-signal supply control means controls the remote-control signal input selection means to select the remote-control signal input means and to connect the remote-control signal input means to the video-signal supply control means, and wherein when the remote-control signal input means is not connected to remote-control signal output means, the video-signal supply control means controls the remote-control signal input selection means to select the remote control reception means of the recording medium reproduction apparatus and to connect the remote control reception means of the recording medium reproduction apparatus to the video-signal supply control means.

3. The remote control system according to claim 2, wherein said remote-control signal output means and said remote-control signal input means are connectable with each other via a communication cable, and wherein said remote-control signal input means has a remote-control signal input terminal in which an RCA jack provided at the end of the communication cable can be plugged.

4. The remote control system according to claim 3, wherein when an RCA jack, provided in the communication cable connected so as to output the remote control signal from the remote-control signal reception means of the video output apparatus, is plugged in the remote-control signal input terminal, said video-signal supply control means causes said video signal supply means to perform supply of the video signal based on the remote control signal inputted into the remote-control signal input terminal from the remote control reception device.

5. The remote control system according to claim 4, wherein said recording medium reproduction apparatus has a power supply output terminal in which an RCA jack, provided in a power supply cable connected to said remote control reception device for electric power supply to said remote control reception device, can be plugged, and wherein when the RCA jack is plugged in the power supply output terminal, said recording medium reproduction apparatus supplies electric power to said remote control reception device via the power supply cable.

6. A recording medium reproduction apparatus comprising:

video signal supply means for playing a recording medium and supplying a video signal obtained by playback to a video output apparatus;

remote-control signal input means for inputting a remote control signal outputted from said video output apparatus;

video-signal supply control means for causing said video signal supply means to perform supply of the video signal based on the remote control signal inputted in said remote-control signal input means;

remote control reception means; and remote-control signal input selection means connected to the video-signal supply control means and to both the remote control reception means and remote-control signal input means, wherein when the remote-control signal input means is connected to remote-control signal output means of the video output apparatus, the video-signal supply control means controls the remote-control signal input selection means to select the remote-control signal input means and to connect the remote-control signal input means to the video-signal supply control means, and wherein when the remote-control signal input means is not connected to the remote-control signal output means, the video-signal supply control means controls the remote-control signal input selection means to select the remote control reception means of the recording medium reproduction apparatus and to connect the remote control reception means of the recording medium reproduction apparatus to the video-signal supply control means.

7. The recording medium reproduction apparatus according to claim 6, wherein said video output apparatus is connectable to a remote-control signal output means of the video output apparatus via a communication cable, and wherein said remote-control signal input means has a remote-control signal input terminal in which an RCA jack provided at the end of the communication cable can be plugged.

8. The recording medium reproduction apparatus according to claim 7, wherein when an RCA jack, provided in the communication cable connected so as to output the remote control signal from a remote control reception device, is plugged in the remote-control signal input terminal, said video-signal supply control means causes said video signal supply means to perform supply of the video signal based on the remote control signal inputted into the remote-control signal input terminal from the remote control reception device.

9. The recording medium reproduction apparatus according to claim 8, further comprising a power supply output terminal in which an RCA jack, provided in a power supply cable connected to said remote control reception device for electric power supply to said remote control reception device, can be plugged, and wherein when the RCA jack is plugged in the power supply output terminal, said recording medium reproduction apparatus supplies electric power to said remote control reception device via the power supply cable.

10. A remote control method, comprising:

using a remote-control signal input selection circuit of a recording medium reproduction apparatus to select a remote-control signal input terminal of the recording medium reproduction apparatus and to connect the remote-control signal input terminal to a video-signal supply control means of the recording medium reproduction apparatus, when the remote-control signal intput terminal is connected to a remote-control signal output terminal of a video display apparatus; and using the remote-control signal input selection circuit to select a remote control photoreception device of the recording medium reproduction apparatus and to connect the remote control photoreception device to the video-signal supply control means, when the remote-control signal input terminal is not connected to the remote-control signal output terminal.

* * * * *